United States Patent [19]

Eyb

[11] Patent Number: 4,969,679
[45] Date of Patent: Nov. 13, 1990

[54] CONVERTIBLE TOP, PARTICULARLY FOR MOTOR VEHICLES

[75] Inventor: Wolfgang Eyb, Leonberg, Fed. Rep. of Germany

[73] Assignee: Ing. h.c.F. Porsche AG, Fed. Rep. of Germany

[21] Appl. No.: 398,909

[22] Filed: Aug. 28, 1989

[30] Foreign Application Priority Data

Aug. 30, 1988 [DE]  Fed. Rep. of Germany ....... 3829346

[51] Int. Cl.[5] .............................................. B60J 7/02
[52] U.S. Cl. ..................................... 296/124; 296/136
[58] Field of Search ............... 296/107, 108, 116, 117, 296/124–134, 136, 37.16

[56] References Cited

U.S. PATENT DOCUMENTS

| | | | |
|---|---|---|---|
| 1,809,505 | 6/1931 | Campbell | 296/107 |
| 3,053,567 | 9/1962 | Geiger | 296/107 |
| 3,401,977 | 9/1968 | Schamel | 296/136 |
| 4,783,113 | 11/1988 | Padlo | 296/136 |
| 4,838,604 | 6/1989 | Kochi | 296/107 |

FOREIGN PATENT DOCUMENTS 1179125  10/1964  Fed. Rep. of Germany .

Primary Examiner—Robert R. Song
Attorney, Agent, or Firm—Evenson, Wands, Edwards, Lenahan & McKeown

[57] ABSTRACT

In order to increase the holding capacity of a trunk in the closed position of a top, a top compartment, for accommodating a convertible top, which reaches from above into a partial area of a trunk, at least in sections, is constructed of an elastic flexible material so that the top compartment can be pushed together in vertical direction.

7 Claims, 1 Drawing Sheet

4,969,679

CONVERTIBLE TOP, PARTICULARLY FOR MOTOR VEHICLES

The present invention generally relates to a convertible top, particularly for motor vehicles.

In German Published, Examined Patent Application (DE-AS) No. 1 179 125, a motor vehicle is shown having a top which can be moved between a closed position and a sunk folded-back position. For housing the folded-back top, a top compartment is provided in the rear area adjacent to the trunk, this top compartment including a bottom and upright lateral walls. The top compartment can be closed from above by a hinged cover. In the case of this top compartment, the bottom and the lateral walls have a rigid construction and form a part of the body structure. It is disadvantageous in this arrangement that the trunk is significantly confined by the top compartment, even in the closed position of the top.

Accordingly, it is an object of the present invention to provide a top compartment wherein the holding capacity of a trunk can be increased in the closed position of the top.

According to preferred embodiments of the present invention, this object and other objects are achieved by constructing the top compartment from a flexible material so that a portion of the top compartment which projects, from above, into the trunk is pushed together, in the vertical direction to provide more space in the trunk.

Main advantages achieved by preferred embodiments of the invention are that, as a result of a flexible construction of the top compartment which is elastic, at least in sections, this top compartment can be pushed together in vertical direction when the top is closed, thereby, when necessary, considerably increasing the holding capacity of the trunk.

Other objects, advantages and novel features of the present invention will become apparent from the following detailed description of the invention when considered in conjunction with the accompanying drawings.

DETAILED DESCRIPTION OF THE DRAWINGS

Figure 1:
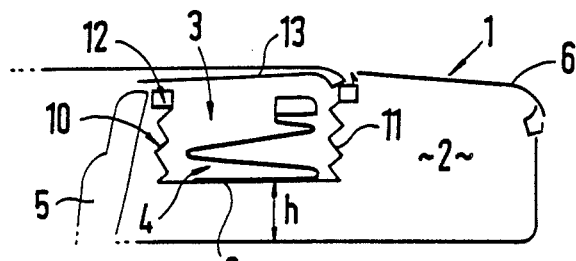
FIG. 1 is a partial longitudinal sectional view of the rear area of a vehicle, the top of which, in a folded-together fashion, is arranged in a rear-side top compartment according to one embodiment of the present invention.

An embodiment is shown in the drawings and will be explained in detail in the following.

FIG. 1 shows a rear part of a motor vehicle 1 with a trunk 2, a top compartment 3 for the accommodation of a folded-back top 4 in sunken position and a seat 5. The trunk 2 is accessible by way of a hinged cover 6 which, at a front end thereof, is hinged to the body by means of hinges which are not shown in detail. The trunk 2 extends from the rear side of a backrest 7 of the seat 5 to an upright rear end wall 8.

The top compartment 3, which has a bottom 9 and lateral walls 10, 11, projects from above into at least a partial area of the trunk 2 located at the front of the trunk 2 and, according to one embodiment of the invention, is, at least in sections, made of an elastic flexible material. As shown in FIG. 1, the rigid bottom 9, is connected by the lateral walls 10, 11, having an accordion-type construction, with a rigid upper frame 12 of the top compartment 3. In top view, the frame 12 has an approximately rectangular shape.

Figure 2:
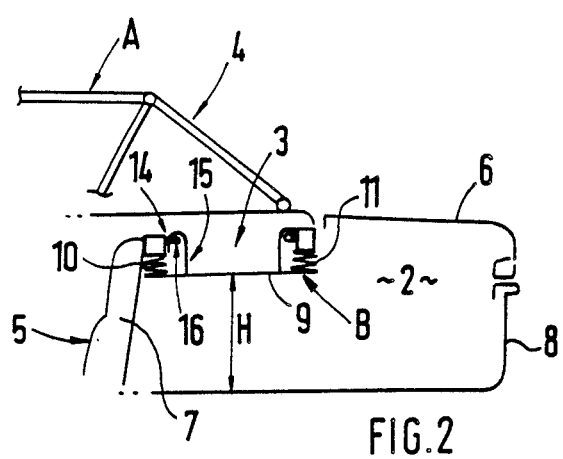
FIG. 2 is a partial longitudinal sectional view of the rear area when the top is closed according to one embodiment of the present invention.

A significant advantage of the elastic construction of the top compartment 3 is the fact that, when top A is closed, the top compartment 3 can be pushed together in a vertical direction, whereby the usable height of the trunk 2 below the top compartment can be enlarged from a measurement h to the measurement H. Thus, when top A is closed, a significantly larger holding capacity of the trunk 2 is available (FIG. 2).

The lateral walls 10, 11 of the top compartment 3 extending in a longitudinal and a transverse direction of the vehicle are made of plastic, fabric or the like. In an upward direction, the top compartment 3 is closed off by a hinged cover 13 which, in a manner not shown in detail, is pivotally connected at a rear end thereof to the vehicle body.

For the fixing of the compacted top compartment 3, a locking device 14 is provided which may, for example, includes a hook 15 mounted at the bottom 9, in which case, this hook 15 can be hung into a tongue 16 of the upper from 12. In addition, the bottom 9, by a compacting arrangement 17 (such as a linkage 18), is connected with the top 4 in such a manner that the bottom 9 is forcibly lifted or lowered according to the position of the top 4.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A convertible top, particularly for motor vehicles, which is movable between an upright closed position and a foldedback sunk position, the convertible top, in the sunk position, being located in a rear-side top compartment arranged adjacent to a trunk, the top compartment having a bottom and upright lateral walls, wherein at least part of the rear-side top compartment projects from above into at least a partial area of the trunk, and comprises an elastic, flexible material having edge portions and a rigid frame connected to said upper edge portions and wherein, in the upright closed position of the convertible top, the top compartment is pushed together in vertical direction by compacting the elastic, flexible material of the rear-side top compartment.

2. A convertible top according to claim 1, wherein the top compartment has a rigid bottom and accordion-type lateral walls, the lateral walls being connected with a stationary upper frame of the top compartment.

3. A convertible top according to claim 1, wherein the lateral walls of the top compartment are made of a plastic material, a fabric material or the like.

4. A convertible top according to claim 1, wherein the top compartment is held in a folded-together position by a locking means.

5. A convertible top according to claim 4, wherein the locking means comprises hooks means arranged at the rigid bottom of the top compartment which is hung into tongues means at the upper frame of the top compartment.

6. A convertible top according to claim 1, wherein the rigid bottom of the top compartment is coupled with the top by compacting means in such a manner that the rigid bottom of the top compartment is forcibly lifted and lowered depending on a position of the top.

7. A convertible top according to claim 1, wherein the top compartment is pushed together in the direction of the stationary upper frame by compacting means.

* * * * *